United States Patent [19]

Tago

[11] Patent Number: 4,618,862

[45] Date of Patent: Oct. 21, 1986

[54] MECHANICAL DISPLACEMENT TRANSDUCER

[75] Inventor: Keiichiro Tago, Kanagawa, Japan

[73] Assignee: Fuji Electric Co., Ltd., Kanagawa, Japan

[21] Appl. No.: 508,755

[22] Filed: Jun. 28, 1983

[30] Foreign Application Priority Data

Jun. 28, 1982 [JP] Japan .................................. 57-111243

[51] Int. Cl.⁴ ...................... G01R 11/52; G08C 19/10
[52] U.S. Cl. ............................... 340/870.37; 324/61 R
[58] Field of Search .................... 340/870.31, 870.32, 340/870.35, 870.37, 870.39; 324/61 R, 60 C

[56] References Cited

U.S. PATENT DOCUMENTS

| | | | |
|---|---|---|---|
| 4,250,490 | 2/1981 | Dahlke | 340/870.37 |
| 4,310,806 | 1/1982 | Ogasawara | 340/870.37 |
| 4,317,116 | 2/1982 | Macho | 340/870.37 |
| 4,339,709 | 7/1982 | Brihier | 340/870.37 |
| 4,389,646 | 6/1983 | Tago | 340/870.37 |
| 4,390,879 | 6/1983 | Kimura | 340/870.37 |
| 4,502,003 | 2/1985 | Frick | 340/870.37 |
| 4,509,007 | 4/1985 | Barsotti | 340/870.37 |

FOREIGN PATENT DOCUMENTS

| | | | |
|---|---|---|---|
| 151309 | 11/1981 | Japan | 340/870.37 |
| 133310 | 8/1982 | Japan | 340/870.37 |
| 168113 | 10/1982 | Japan | 340/870.37 |

Primary Examiner—John W. Caldwell, Sr.
Assistant Examiner—Michael F. Heim
Attorney, Agent, or Firm—Sughrue, Mion, Zinn, Macpeak, and Seas

[57] ABSTRACT

A two-wire displacement converter for converting minute mechanical displacements to a DC output signal requiring no precision components yet providing a highly accurate output signal. A pair of first and second AC-excited reactive elements is provided, at least one of which has an impedance which varies in response to the mechanical displacement. DC signals proportional to the impedances of the first and second impedance elements are supplied to a differential amplifier, which produces an output signal having a magnitude related to the difference between the first and second current signals, and thus indicative of the amount of mechanical displacement. A current regulator circuit maintains a sum of a third current signal through a third reactive impedance element having a fixed impedance and at least one of the first and second current signals at a predetermined, fixed value.

7 Claims, 3 Drawing Figures

MECHANICAL DISPLACEMENT TRANSDUCER

BACKGROUND OF THE INVENTION

The present invention relates to a displacement converter for detecting a mechanical displacement as a variation in a reactive impedance (such as an electrostatic capacitance), for converting such a variation into an electric signal, and for transmitting the electric signal to a receiving instrument.

Conventional displacement converters of the type described include a movable electrode disposed between two fixed electrodes for detecting a difference between two pressures. The movable electrode is displaceable in response to the pressure difference whereby a pair of electrostatic capacitances $C_1$ and $C_2$ disposed between the fixed electrodes and the movable electrode differentially vary, and the ratio $(C_1-C_2)/(C_1+C_2)$ is proportional to the ratio of mechanical displacements $\Delta d/d$.

An example of such a conventional displacement converter is shown in FIG. 1 of the accompanying drawings. The displacement converter is supplied with electric current via a transmission line from an external power supply 2 connected to a load 1. To the external power supply 2 are coupled in series a field-effect transistor (FET) 3, a resistor 3 and a zener diode 5. A constant current is caused to flow through the zener diode 5 by the action of the FET 3. The FET 3 has a gate connected to the base of a bipolar transistor 6 from which drive currents are supplied to an oscillator 7, differential amplifiers 8, 9 and other elements. The oscillator includes a transformer having a primary winding 72 connected in series with a transistor 71 and a feedback winding 73, resistors 74 and 75, and capacitors 76 and 77. The primary winding 72 causes AC voltages to be induced across secondary windings 10, 11 and 12. Diodes 13, 14, 15 and 16 serve to pass currents only through the secondary winding 10 and 11 during positive half cycles of the induced AC voltages and to pass a current through the secondary winding 12 only during negative half cycles of the AC voltages. More specifically, the current $I_1$ flowing through the secondary winding 10 passes through a closed circuit composed of a resistor 17, a resistor 19, a grounded capacitor 20, a capacitor $C_1$, a diode 13, and the secondary winding 10. The current $I_2$ flowing through the secondary winding 11 passes through a closed circuit composed of a resistor 18, the resistor 19, the grounded capacitor 20, a capacitor $C_2$, a diode 14, and the secondary winding 11. Furthermore, the current which flows through the secondary winding 12 during negative half cycles passes through a closed circuit composed of the secondary winding 12, both the diodes 15 and 16, both the capacitors $C_1$ and $C_2$, the grounded capacitor 20, and the secondary winding 12.

The capacitors $C_1$ and $C_2$ have electrostatic capacitances which differentially vary in response to a mechanical displacement. In the positive half cycles, the current $I_1$ induced in the secondary winding 10 and which flows through the resistors 17 and 19 has a magnitude dependent on the electrostatic capacitance of the capacitor $C_1$, and the current $I_2$ induced in the secondary winding 11 and which flows through the resistors 18 and 19 has a magnitude dependent on the electrostatic capacitance of the capacitor $C_1$. As a result, a voltage $E_o$ which corresponds to the sum of the capacitances of the capacitors $C_1$ and $C_2$ appears as a voltage drop across the resistor 19:

$$E_o = R_o(I_1 + I_2), \tag{1}$$

where $R_o$ is the resistance of the resistor 19. The voltage $E_o$ is compared in the differential amplifier 8 with a voltage drop (reference voltage) across a voltage dividing resistor 22 of a voltage divider composed of resistors 21 and 22. The differential amplifier 8 produces in response thereto an output which controls the amplitude of the oscillating voltage produced by the oscillator 7. Since the voltage across the voltage divider resistors 21 and 22 is maintained at a constant level by the zener diode 5, the voltage $E_o$, the value of which varies in accordance with the sum of the capacitances of the capacitors $C_1$ and $C_2$, is controlled so as to be maintained at a constant reference voltage value.

A voltage $E_3$, the value of which is determined by the difference $(C_1-C_2)$ between the capacitances of the capacitors $C_1$ and $C_2$, is produced as a voltage drop across the resistors 17 and 18. More specifically, a voltage $E_1$, the value of which is determined by the capacitance of the capacitor $C_1$, appears as a voltage drop across the resistor 17, and a voltage $E_2$, the value of which is determined by the capacitance of the capacitor $C_2$, appears as a voltage drop across the resistor 18. The resistances $R_1$ and $R_2$ of the resistors 17 and 18, respectively, are given as follows:

$$E_1 = R_1 I_1 + E_o, \text{ and} \tag{2}$$

$$E_2 = R_2 I_2 + E_o. \tag{3}$$

These voltages $E_1$ and $E_2$ are applied via resistors 23 and 24 to the differential amplifier 9, from which the differential voltage $E_3$ is produced:

$$E_3 = E_1 - E_2 = R(I_1 - I_2), \tag{4}$$

where $R_1 = R_2 = R$. An output transistor 25 is controlled by the output of the differential amplifier 9.

Assuming that the amplitude of the AC voltage induced in the secondary windings within the oscillator 7 is v and its frequency f, the following equations may be written:

$$I_1 = f \cdot v \cdot C_1, \tag{5}$$

$$I_2 = f \cdot v \cdot C_2, \tag{6}$$

$$E_3 = R(I_1 - I_2) = R \cdot f \cdot v (C_1 - C_2), \text{ and} \tag{7}$$

$$E_o = R_o(I_1 + I_2) = R_o \cdot f \cdot v \cdot (C_1 + C_2). \tag{8}$$

From equation (8) results the following equation:

$$f \cdot v = E_o \frac{1}{R_o} \frac{1}{C_1 + C_2} \tag{9}$$

Substituting equation (9) for $f \cdot v$ in eqaution (8), $$E_3 = E_o \cdot \frac{R}{R_o} \cdot \frac{C_1 - C_2}{C_1 + C_2}. \tag{10}$$

Assuming that the area of the electrodes of each of the capacitors $C_1$ and $C_2$ is A, the distance between the electrodes is d, a change in the interelectrode spacing due to a mechanical displacement is $\Delta d$, and the dielectric constant is $\epsilon$, the capacitances of the capacitors $C_1$ and $C_2$ can be expressed as follows:

$$C_1 = \frac{\epsilon A}{d - \Delta d} \text{ and } C_2 = \frac{\epsilon A}{d + \Delta d}. \tag{11}$$

Therefore:

$$\frac{C_1 - C_2}{C_1 + C_2} = \frac{\Delta d}{d}. \tag{12}$$

Substituting equation (12) for the corresponding term in equation (10), the following equation results:

$$E_3 = E_o \cdot \frac{R}{R_o} \cdot \frac{\Delta d}{d}. \tag{13}$$

The differential voltage $E_3$ is proportional to the mechanical displacement $\Delta d$, and the magnitude of the output current flowing through output transistor 25 is directly dependent on the differential voltage $E_3$. Thus, the output current I is in proportion to the mechanical displacement $\Delta d$.

The voltage drop generated across a resistor 28 by the output current I flowing therethrough is fed back through a resistor 26 to one of the inputs of the differential amplifier 9, the other input thereof being connected to a resistor 27. In the conventional displacement converter shown in FIG. 1, the voltage $E_o$ and the reference voltage (voltage drop across the resistor 22) are compared with each other by the differential amplifier 8, which produces a differential voltage based on which an oscillating voltage in the oscillator 7 is controlled to equalize the voltage $E_o$ to the reference voltage, that is, to maintain the voltage $E_o$ at a constant level. Therefore, if the voltage $E_o$ varies, then the differential voltage $E_3$ varies in the manner expressed by equation (13), and hence the output current I changes, resulting in an error. Thus, the components involved in generating the reference voltage, that is, the FET 3, the zener diode 5, the transistor 6, the differential amplifier 8 and the resistor 22, are required to be highly stable in their characteristics. This is of course disadvantageous in that such components are costly. Also, stray or parasitic capacitances associated with the capacitors $C_1$ and $C_2$ have non-negligible effects on the output current I.

The present invention has been made in view of the above difficulties. It is an object of the present invention to provide a displacement converter which requires no components that require highly stable characteristics, is composed of a reduced number of parts with the number of differential amplifiers used being reduced, and is free from adverse effects due to stray or parasitic capacitances.

SUMMARY OF THE INVENTION

According to the present invention, the above and other objects are achieved by providing a two-wire displacement converter circuit for converting a minute mechanical displacement to an electric DC current signal comprising a pair of first and second AC-excited reactive impedance elements with at least one of the first and second impedance elements having an impedance variable in response to the mechanical displacement, means for supplying a first and a second DC current signals proportional to the impedances respectively of the first and second impedance elements, first means for supplying an output current signal corresponding to a difference between the first and second current signals and indicative of the amount of the mechanical displacement, a third reactive impedance element having a fixed impedance, and second means for supplying a third current signal proportional to the impedance of the third impedance element with the sum of the third current signal and at least one of the first and second current signals being maintained at a predetermined value by a current regulator.

Features of the present invention include the following:

(1) The first and second impedance elements have impedances which are made to vary differentially from each other, and the sum of the first and second DC current signals and the third current signals are maintained at a constant value controlled by the current regulator.

(2) The first and second impedance elements have fixed and variable impedances, respectively, and the sum of the second and third current signals is maintained at a constant value controlled by the current regulator while the first current signal is unregulated.

(3) The first and second impedance elements are simultaneously excited with one polarity in one half cycle of AC excitation and excited with the opposite polarity in subsequent half cycles of AC excitation.

(4) The first means includes a differential amplifier having a pair of inputs responsive to the first and second current signals, respectively, and an output responsive to a difference between the two input current signals, an output transistor responsive to an output from the differential amplifier for supplying an output current signal indicative of the amount of the mechanical displacement, a feedback resistor receptive of substantially all of the output current and connected to one of the inputs of the differential amplifier for applying a feedback signal thereto, and a zero adjustment resistor with respective terminals connected between the two inputs of the differential amplifier and an intermediate (adjustable) terminal coupled indirectly to a feedback circuit connected to the feedback resistor the above-mentioned one input of the differential amplifier for supplying the feedback signal to this input.

(5) The first means includes a differential amplifier having a pair of inputs responsive to the first and second current signals, respectively, and an output responsive to a difference between the two input signals, an output transistor responsive to an output from the differential amplifier for supplying an output current signal indicative of the amount of the mechanical displacement, and a damping circuit coupled to one of the inputs of the differential amplifier, the damping circuit having a damping capacitor, switching means, and voltage divider means, the switching means being capable of connecting the damping capacitor to one input of the differential amplifier when a damping operation is required, and of connecting the damping capacitor to a predetermined voltage level when no damping operation is required.

(6) The current regulator is composed of a series connection of a current regulating transistor and a series resistor for controlling the current regulating transistor, and the second means is comprised of a pair of rectifiers for commutating an AC current flowing through the third impedance element to one and the opposite polarity, and a detecting means for detecting a voltage across the current regulating transistor, the commutated current of one polarity being fed to the series resistor, and the commutated current of the opposite polarity being fed to the detecting means.

DESCRIPTION OF THE PREFERRED EMBODIMENTS

Figure 2:
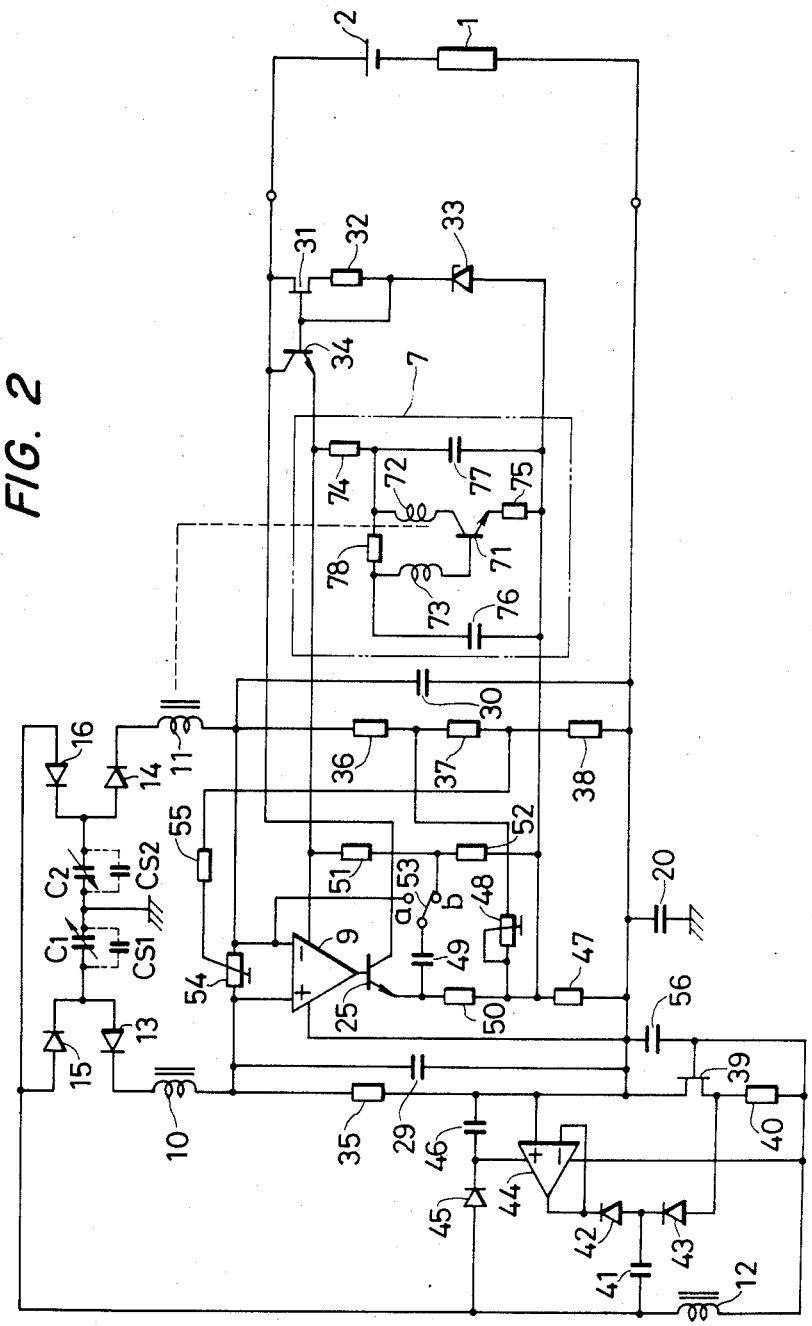
FIGS. 2 and 3 are, respectively, circuit diagrams of first and second preferred embodiments of a displacement converter of the invention.

FIG. 2 is a circuit diagram of a preferred embodiment of a displacement converter of the present invention. The displacement converter is supplied with electric current via a transmission line from an external power supply 2 connected to a load 1. A field-effect transistor (FET) 31, a resistor 32, and a zener diode 33 are connected in series with the external power supply 2. The FET 31 functions to cause a constant current to pass through the zener diode 33. The FET 31 has a gate coupled to the base of a bipolar transistor 34 through which a drive current is supplied to an oscillator (AC exciting means) 7, a differential amplifier 9 and other elements. The oscillator includes a transformer having a primary winding 72 which induces AC voltages in secondary windings 10, 11, and 12. Diodes 13, 14, 15 and 16 permit currents to flow through the secondary windings 10 and 11 only during the positive half cycles of the induced AC voltages and a current to flow through the secondary winding 12 only during negative half cycles.

Stray capacitors $C_{s1}$ and $C_{s2}$ are connected in parallel with capacitors $C_1$ and $C_2$, respectively. The currents which flow through the capacitors $C_1$ and $C_2$ are herein designated as $I_1$, and $I_2$, respectively, and the currents which flow through the stray capacitors $C_{s1}$ and $C_{s2}$ as $I_{s1}$ and $I_{s2}$, respectively. The current $(I_1+I_{s1})$ flowing through the secondary winding 10 in the positive half cycles flows through a closed circuit composed of a resistor 35, a grounded capacitor 20, the capacitor $C_1$ and the stray capacitor $C_{s1}$, a diode 13, and the secondary winding 10. The current $(I_2+I_{s2})$ flowing through the secondary winding 11 in the positive half cycles passes through a closed circuit including a resistor 36, a resistor 37, a resistor 38, the grounded capacitor 20, the capacitor $C_2$ and the stray capacitor $C_{s2}$, a diode 14, and the secondary winding 11. The current $I_1$, $I_2$, $I_{s1}$ and $I_{s2}$ can be expressed as follows:

$$I_1 = [f(v-V)]C_1, \quad (14)$$

$$I_2 = [f(v-V)]C_2, \quad (15)$$

$$I_{s1} = [f(v-V)]C_{s1}, \text{ and} \quad (16)$$

$$I_{s2} = [f(v-V)]C_{s2}. \quad (17)$$

The values of the stray capacitances $C_{s1}$ and $C_{s2}$ are equalized by choosing the values of the capacitors $C_1$ and $C_2$ such that:

$$C_{s1} = C_{s2} = C_s. \quad (18)$$

With the drain-to-source voltage of the field-effect transistor (FET) 39 designated by $V_{DS}$, the voltage drop across a source resistor 40 of the FET 39 by $V_{GS}$, and the voltage drop across the resistor 35 by $V_1$, the voltage V in equations (14) through (17) above may be written:

$$V = V_1 + V_{DS} + V_{GS}. \quad (19)$$

The resistance $R_{10}$ of the resistor 35, and the resistances $R_{11}$, $R_{12}$ and $R_{13}$ of the resistors 36, 37 and 38, respectively, have the following relationship:

$$R_{10} = R_{11} + R_{12} + R_{13}. \quad (20)$$

A current $[(I_1+I_{s1})+(I_2+I_{s2})]$ which flows through the secondary winding 12 during negative half cycles flows through a closed circuit composed of the secondary winding 12, both diodes 15 and 16, both the capacitors $C_1$ and $C_2$, both the stray capacitors $C_{s1}$ and $C_{s2}$, the grounded capacitor 20, the FET 39, a resistor 40, and the secondary winding 12.

The drain current $[(I_1+I_{s1})+(I_2+I_{s2})]$ of the FET 39 is determined by the gate-to-source voltage $V_{GS}$ of the FET 39, and the voltage $V_{GS}$ can be expressed as the product of the resistance of the resistor 40 and a current $I_o$ flowing through the resistor 40. The current $I_o$ is controlled so as to be constant by a self-biasing action of the FET 39.

According to the present invention, there are further included in this circuit a compensation capacitor 41 for compensating for influences of the stray capacitances $C_{s1}$ and $C_{s2}$, rectifying diodes 42 and 43 for producing negative and positive charging currents, respectively, for the compensation capacitor 41, and a differential amplifier 44 for detecting the drain voltage of the FET 39. An AC voltage is applied by the secondary winding 12 to the compensation capacitor 41 to cause a positive charging current flowing through the compensation capacitor 41 to pass through the source resistor 40 of the FET 39 via the diode 43 and to cause a negative charging current to flow through the differential amplifier 44 via the diode 42. Therefore, the charging current for the compensation capacitor 41 in the negative half cycles of the voltage across the secondary winding 12 flows through a closed circuit including the secondary winding 12, the compensation capacitor 41, the diode 42, the differential amplifier 44, and the secondary winding 12. In the positive half cycles of the voltage, the charging current for the compensation capacitor 41 flows through a closed circuit composed of the secondary winding 12, the resistor 40, the diode 43, the compensation capacitor 41, and the secondary winding 12.

The charging current $I_c$ for the compensation capacitor 41 can be expressed by the following equation:

$$I_c = [f(v-V')]C_c, \quad (21)$$

where $C_c$ is the capacitance of the compensation capacitor 41 and $V' = V_{DS} + V_{GS}$. Thus, the current $I_o$ flowing through the resistor 40 is given by:

$$\begin{aligned} I_o &= [(I_1 + I_{s1}) + (I_2 + I_{s2})] - I_c \\ &= (I_1 + I_2) + (I_{s1} + I_{s2}) - I_c \\ &= [f(v - V)](C_1 + C_2) + 2[f(v - V)]C_s - [f(v - V')]C_c. \end{aligned} \quad (22)$$

By determining the capacitance $C_c$ of the compensation capacitor 41 according to the following equation (23), the equation (22) is modified into the equation (24), removing the effect of the stray capacitance $C_s$:

$$2[f(v-V)]C_s = [f(v-V)]C_c, \quad (23)$$

$$I_o = [f(v-V)](C_1+C_2) = \text{Constant}. \quad (24)$$

A diode 45 and a capacitor 46 serve as a rectifying diode and a smoothing capacitor, respectively, for using the AC voltage from the secondary winding 12 for powering the differential amplifier 44.

The output current I in the embodiment shown in FIG. 2 can be derived as follows: The voltage drop across the resistor 35 and the voltage drop across the resistors 36, 37 and 38 are applied to respective inputs of the operational amplifier 9 which detects the difference between the voltage drops. The difference signal is converted by the output transistor 25 into the output current I, which is fed back to the resistors 37 and 38 through which the DC current $I_2$ flows via a load resistor 47 for the output transistor 25 and a resistor 48 for the operational amplifier 9. As a consequence, the voltage difference across the input terminals of the operational amplifier 9 is forced to zero, whereupon the following equation (25) is established:

$$R_{10}(I_1+I_{s1}) = (R_{11}+R_{12}+R_{13})(I_2+I_{s2}) + (R_{12}+R_{13})I_f, \quad (25)$$

where $I_f$ is the feedback current flowing through the reistors 37 and 38. Employing the relationships of the equations (18) and (20), the feedback current $I_f$ is derived from equation (25) as follows:

$$I_f = \frac{R_{10}}{R_{12}+R_{13}}(I_1-I_2). \quad (26)$$

The Kirchhoff's laws can be applied to the feedback circuit composed of the resistors 37, 38, 47, 48 as follows. Assuming that when the mechanical displacement $\Delta d$ is zero, that is, the capacitances of the capacitors $C_1$, $C_2$ are equal, a current $I_B$ flows through the output transistor 25. The current $I_B$ serves as a base (lower limit) current with respect to the output current I, and corresponds to 4 mA as compared with a signal current ranging from 4 to 20 mA. In the measurement mode in which there is a mechanical displacement $\Delta d$, the sum ($I_B+I$) of the base current $I_B$ and the output current I related to the mechanical displacement $\Delta d$ flows through the output transistor 25. A current ($I_B+I-I_f$) flows through the load resistor 47 in the closed circuit composed of the resistors 37, 38, 47 and 48, the feedback current $I_f$ flows through the resistor 48, and a current ($I_2+I_{s2}+I_f$) flows through the resistors 37 and 38. The following equation can thus be written:

$$R_{20}(I_B+I-I_f) = R_f I_f + (R_{12}+R_{13})(I_2+I_{s2}+I_f), \quad (27)$$

where $R_{20}$ is the resistance of the resistor 47 and $R_f$ is the resistance of the resistor 48.

Using only those terms in equation (27) which relate to the mechanical displacement $\Delta d$, the following equation can be written:

$$R_{20}(I-I_f) = R_f I_f + (R_{12}+R_{13})(I_2+I_f). \quad (28)$$

The output current I can be found from equation (28) by substituting equation (26) for the feedback current $I_f$:

$$I = \frac{R_{10}(R_0+R_f+R_{12}+R_{13})}{R_{20}(R_{12}+R_{13})} \cdot (I_1-I_2) + (R_{12}+R_{13})I_2 \quad (29)$$

$$K_1 = \frac{R_{10}(R_0+R_f+R_{12}+R_{13})}{R_{20}(R_{12}+R_{13})} \quad K_2 = R_{12}+R_{13}.$$

Substituting equations (14) and (15) for the corresponding terms in equation (29):

$$I = K_1[f(v-V)](C_1-C_2) + K_2[f(v-V)]C_2. \quad (30)$$

Substituting equation (24) for the corresponding terms in equation (30):

$$I = K_1 I_o \frac{C_1-C_2}{C_1+C_2} + K_2 I_o \frac{C_2}{C_1+C_2}. \quad (31)$$

The following relationships are apparent from the equation (11):

$$\frac{C_1-C_2}{C_1+C_2} = \frac{\Delta d}{d}, \text{ and } \frac{C_2}{C_1+C_2} = \frac{1}{2}\left(1-\frac{\Delta d}{d}\right).$$

Thus, equation (31) can be rewritten as follows:

$$I = \frac{1}{2}K_2 I_o + (K_1 - \frac{1}{2}K_2)I_o \frac{\Delta d}{d} \quad (32)$$

$$= G_1 + G_2 \frac{\Delta d}{d}$$

$$G_1 = \frac{1}{2}K_2 I_o = \text{Constant}$$

$$G_2 = (K_1 - \frac{1}{2}K_2)I_o = \text{Constant}.$$

Since the first term $G_1$ and the second term $G_2$ on the right side of equation (32) are constants, the output current I is proportional only to the mechanical displacement $\Delta d$. Thus, any influence on the output current I due to the stray capacitances $C_{s1}$ and $C_{s2}$ is eliminated.

The two-wire displacement converter of the type described serves to transmit a signal representing a parameter in an industrial process such as a pressure as a DC current I having a range of 4 to 20 mA.

As the process parameter to be transmitted ordinarily can be expected to contain noise pulses, it is required that such factor be removed from the DC current I prior to transmission. To this end, there is provided a damping circuit composed of resistors and a capacitor for removing such pulsating components. The displacement converter as shown in FIG. 2 includes such a damping circuit, which is designed to eliminate all transient variations in the output current. This damping circuit includes a delay circuit composed of a damping capacitor 49 and the resistors 36, 37 and 38, a resistor 50, a voltage divider circuit composed of two resistors 51 and 52, and a switch 53.

Where there is no need for damping, the pole of the switch 53 is set to a contact b. At this time, the potential at the junction between the resistors 51 and 52 is set so as to be substantially equal to the potential at the inverting input terminal of the differential amplifier 9, that is, the potential at the junction between the resistor 36 and the secondary winding 11. The potential at the junction between the resistor 36 and the secondary winding 11 varies with the current $I_2$ of the mechanical displacement Δd. With the junction potential set to change from 2.5 V to 3.0 V for the entire range of mechanical displacement Δd of 0 to 100%, the resistances of the resistors 51 and 52 are selected such that the potential at the junction between the resistors 51 and 52 is about 2.5 V. Thus, the capacitor 49 is charged up to about 2.5 V when no damping is to be carried out. Even when the pole of the switch 53 is set to a contact a to connect the capacitor 49 to the input of the differential amplifier 9 for damping, no appreciable transient variations are present.

If the damping capacitor 49 were not charged in advance through the resistors 51 and 52, the input to the differential amplifier 9 would be subjected to voltage variations ranging from about 2.5 V to 3.0 V upon connection of the capacitor 49 to the differential amplifier 9, and hence large transient variations would result from such connection of the capacitor 49.

The function, construction and operation of the damping circuit of FIG. 2 are well known and will not be described here.

The displacement converter according to the preferred embodiment of the invention shown in FIG. 2 includes a zero adjustment circuit, which is primarily composed of a variable resistor 54 connected between the pair of inputs of the differential amplifier 9, and a resistor 55 coupled at one end to a variable tap of the variable resistor 54, with the other end being connected to the junction between the resistors 37 and 38. The resistances of the resistors 37 and 38 are selected such that variations in the voltage drop across the resistor 37 will equal the variations in the voltage drop across the resistor 38. This renders the voltage across the resistor 55 constant at all times, and thus the current flowing through the resistor 55 is constant at all times.

Also, if the electrostatic capacitances of the capacitors $C_1$ and $C_2$ are equal, the currents $I_1$ and $I_2$ should be equal and the voltage difference between the inputs of the differential does not fall to zero for some reason, the variable tap of the variable resistor 54 can be moved to adjust the ratio between a current $i_1$ flowing from the secondary winding 10 to the variable resistor 54 and a current $i_2$ flowing from the secondary winding 11 to the variable resistor 54 until the voltage difference between the inputs of the differential amplifier 9 becomes zero. The sum of the currents $i_1$ and $i_2$ flowing through the resistor 55 is always kept constant because the voltage across the resistor 55 remains constant at all times. Although the sum of the currents $i_1$ and $i_2$ flows into the resistor 38, the sum of the currents is extremely small and constant and can be neglected in the above equations.

Figure 3:
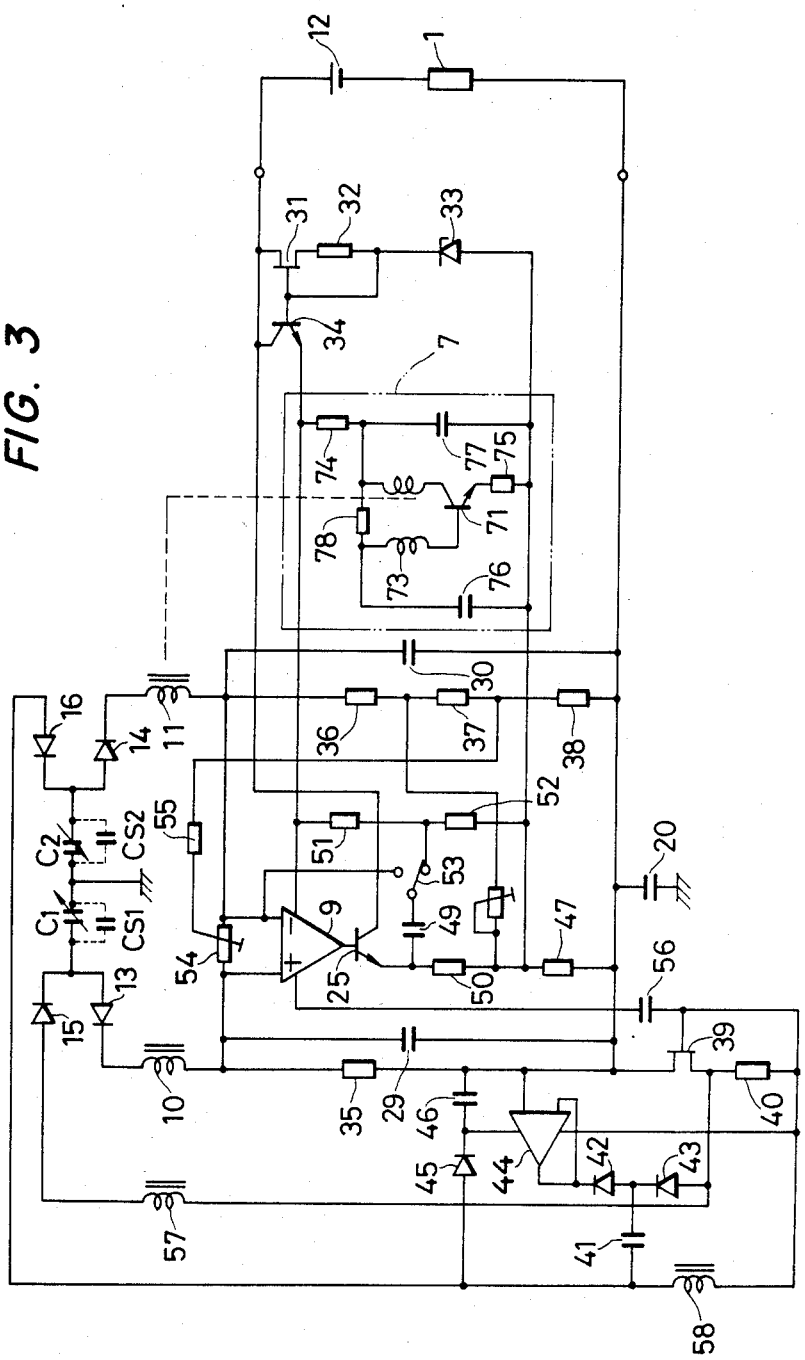

FIG. 3 is a circuit diagram of another preferred embodiment of the present invention. In this embodiment, the capacitor $C_1$ is fixed, and only the capacitance of the capacitor $C_2$ varies with the mechanical displacement Δd. The circuit arrangement shown in FIG. 3 is basically the same as that of FIG. 2, except that secondary windings 57 and 58 are connected to the diodes 15 and 16, respectively.

With such a circuit arrangement, an arithmetic operation of $(C_1-C_2)/C_2$ is performed. Operation of the circuit arrangement of FIG. 3 is substantially the same as that of the circuit arrangement shown in FIG. 2, and hence will not be described in detail. However, it may be mentioned that the current $[(I_2+I_{s2})-I_c]$ is controlled by the FET 39 so as to be constant in the circuit of FIG. 3.

Figure 1:
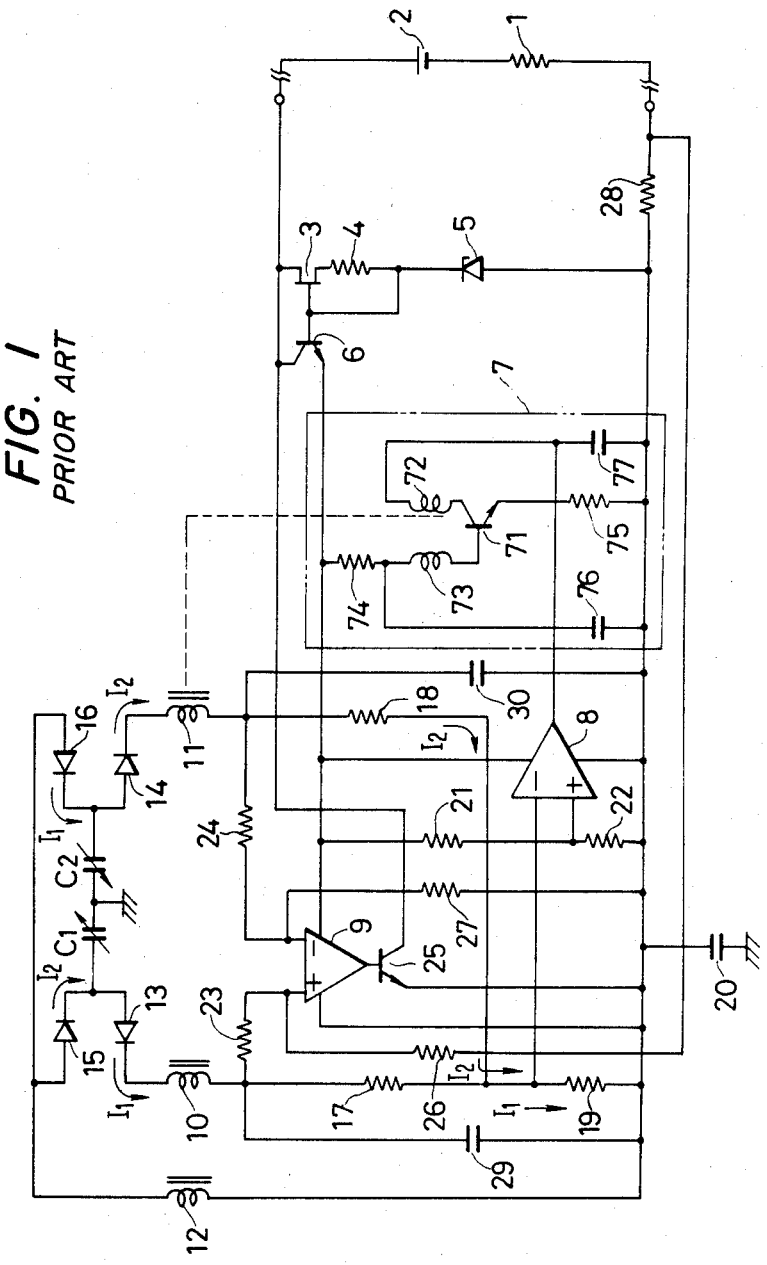
FIG. 1 is a circuit diagram of a conventional displacement converter.

With the present invention, as described above, the FET 39 serves to keep constant the sum of currents, that is, at least one of the currents $I_1$ and $I_2$ flowing through the capacitors $C_1$ and $C_2$, respectively, and the current $I_c$ flowing through the compensation capacitor 41. Consequently, the FET 31, the zener diode 33 and the transistor 34 are mainly used for supplying a drive voltage for the oscillator 7 and the differential amplifier 9, and not as a reference voltage element as in the conventional circuit illustrated in FIG. 1. Therefore, these elements need not have extremely precise and stable characteristics. The FET 31, the zener diode 33 and the transistor 34 used in the circuit of the invention are much less costly than their counterparts in the prior art arrangement. The compensation capacitor 41 is provided for compensating for influences of the stray capacitances $C_{s1}$ and $C_{s2}$. The combination of the current $I_c$ passing through the compensation capacitor 41 and the current $[(I_1+I_{s1})+(I_2+I_{s2})]$ or the current $(I_2+I_{s2})$ is controlled by the FET so as to be constant. Therefore, the effect of the stray capacitances is nullified using only simple circuit construction. The differential amplifier 44 compensates for the stray capacitance $C_s$. Hence, the differential amplifier 8 used in the conventional circuit of FIG. 1 is eliminated. Therefore, the displacement converter circuit of the invention can be fabricated with a reduced number of parts.

I claim:

1. A two-wire displacement converter circuit for converting a minute mechanical displacement to a DC current signal, comprising: a pair of first and second AC-excited reactive impedance elements, at least one of said first and second impedance elements having an impedance variable in response to said mechanical displacement; means for supplying first and second DC current signals proportional to the impedances of said first and second impedance elements, respectively; first means for supplying an output current signal corresponding to a difference between said first and second current signals and indicative of the amount of said mechanical displacement; a third reactive impedance element having a fixed impedance; second means for supplying a third current signal proportional to the impedance of said third impedance element; and current regulating means for maintaining a sum of said third current signal and at least one of said first and second current signals at a predetermined value.

2. The two-wire displacement converter circuit according to claim 1, wherein said first and second impedance elements have impedances differentially variable with respect to each other, wherein said current regulating means maintains the sum of said first and second DC current signals and said third current signals are maintained at a constant value.

3. The two-wire displacement converter circuit according to claim 1, wherein said first and second impedance elements have fixed and variable impedances, respectively, wherein said current regulating means maintains the sum of said second and third current signals at a constant value while said first current signal is unregulated.

4. The two-wire displacement converter circuit according to claim 1, wherein said first and second impedance elements are simultaneously excited with one polarity in one half cycle of AC excitation and simultaneously executed with the opposite polarity in a subsequent other half cycle of AC excitation.

5. The two-wire displacement converter circuit according to claim 1, wherein said first means comprises: a differential amplifier having a pair of inputs responsive to respective ones of said first and second current signals, and an output responsive to a difference between said two input current signals; an output transistor responsive to an output from said differential amplifier for supplying an output current signal indicative of the amount of said mechanical displacement; a feedback resistor receptive of substantially all of said output current and connected to one of said inputs of said differential amplifier for applying a feedback signal thereto, and a zero adjustment resistor having end terminals connected between said two inputs of said differential amplifier and an intermediate adjustable terminal coupled to a feedback circuit connected to said feedback resistor and said one input of said differential amplifier for supplying said feedback signal to said one input.

6. The two-wire displacement converter circuit according to claim 1, wherein said first means comprises: a differential amplifier having a pair of inputs responsive to said first and second current signals, respectively, for providing an output responsive to a difference between said two input current signals; an output transistor having an input electrode responsive to an output from said differential amplifier for supplying an output current signal indicative of the amount of said mechanical displacement; and a damping circuit coupled to one of said inputs of said differential amplifier, said damping circuit comprising a damping capacitor, switching means, and voltage divider means, switching means connecting said damping capacitor to one input of said differential amplifier when damping operation is required, and connecting said damping capacitor to said voltage divider means to charge said damping capacitor to a predetermined voltage level when no damping operation is required.

7. The two-wire displacement converter circuit according to claim 1, wherein said current regulator comprises a series connection of a current regulating transistor and a series resistor for controlling said current regulating transistor, and said second means comprises a pair of rectifiers for commutating an AC current flowing through said third impedance element to one polarity and the polarity opposite said one polarity and a detecting means for detecting a voltage across said current regulating transistor, the commutated current of said one polarity being applied to said series resistor, and the commutated current of said opposite polarity being applied to said detecting means.

* * * * *